Feb. 13, 1962 G. P. HUPPKE ETAL 3,020,977
FILTER DEVICE
Filed Aug. 19, 1959 2 Sheets-Sheet 1
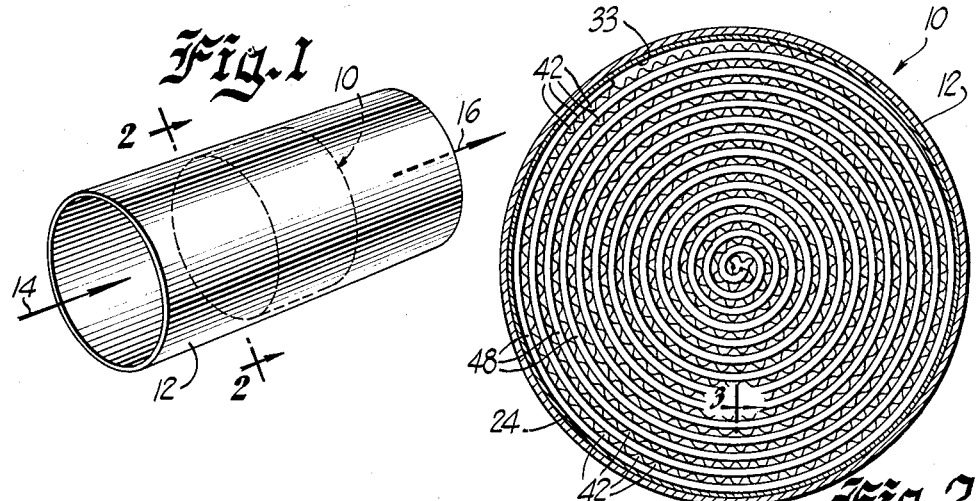
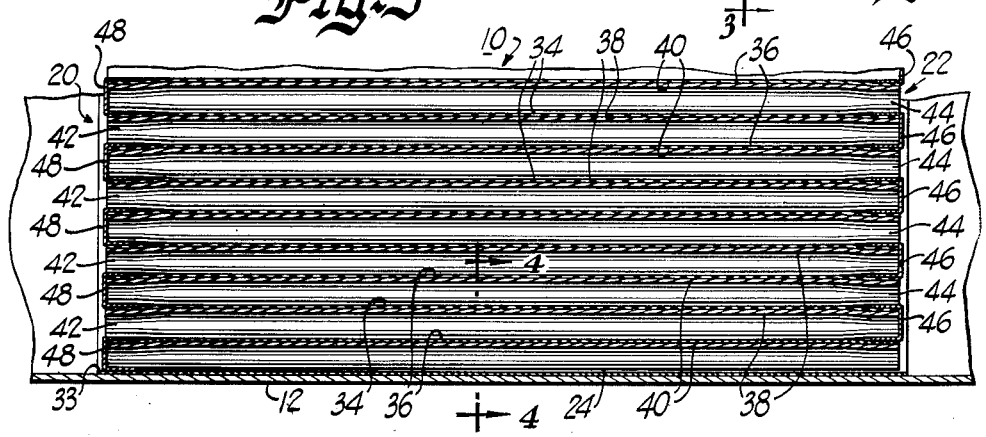
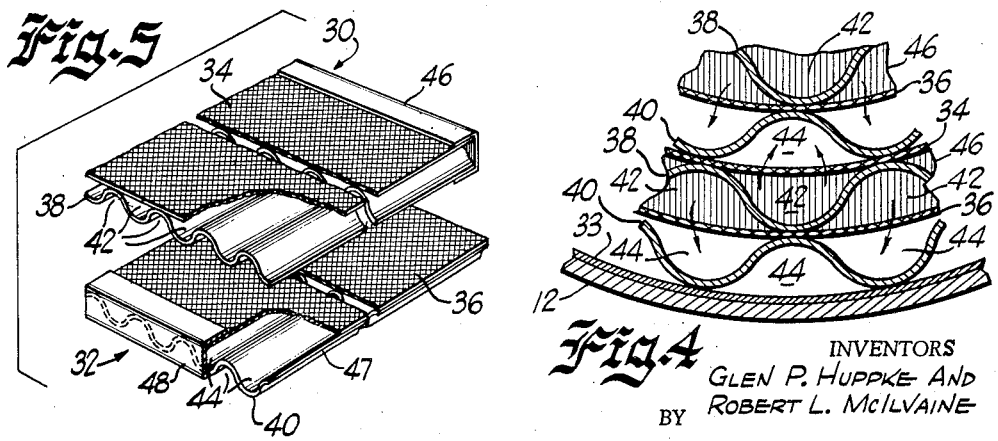
INVENTORS
GLEN P. HUPPKE AND
ROBERT L. McILVAINE
BY Mason, Kolehmainen, Rathburn and Wyss
ATTORNEYS.

Feb. 13, 1962 G. P. HUPPKE ETAL 3,020,977
FILTER DEVICE
Filed Aug. 19, 1959 2 Sheets-Sheet 2
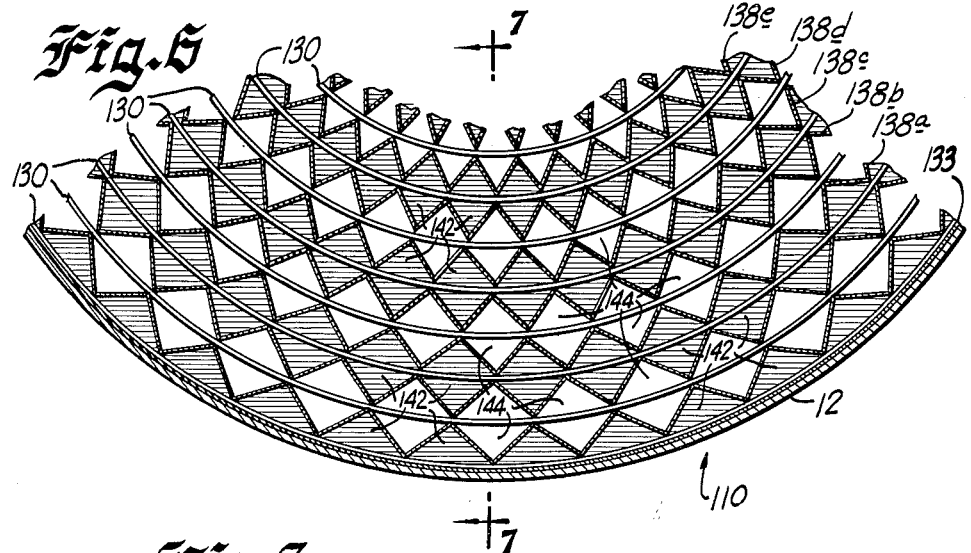
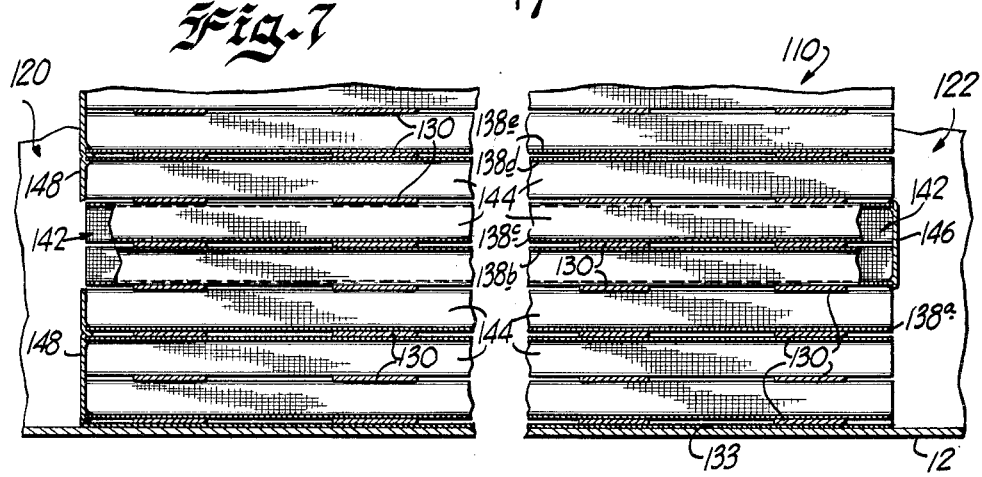
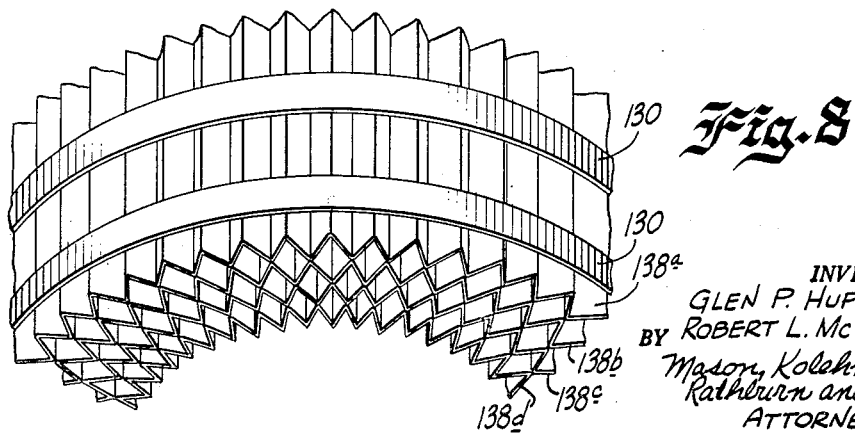
INVENTORS
GLEN P. HUPPKE AND
BY ROBERT L. McILVAINE
Mason, Kolehmainen,
Rathburn and Wyss
ATTORNEYS United States Patent Office 3,020,977
Patented Feb. 13, 1962

3,020,977
FILTER DEVICE
Glen P. Huppke, Beaver Falls, N.Y., and Robert L. McIlvaine, Winnetka, Ill., assignors to Herbert Simpson Corporation, Chicago, Ill., a corporation of Illinois
Filed Aug. 19, 1959, Ser. No. 834,857
2 Claims. (Cl. 183—73)

The present invention relates generally to a new and improved filter device and, more particularly, relates to a dry type filter for economically and efficiently removing dust and other solid contaminants from a contaminated medium such as dust laded air, gas, and the like.

It is the primary object of the present invention to provide a new and improved filter device which may be inexpensively and easily manufactured.

It is a further object of the present invention to provide a compact, highly efficient filter device which occupies a minimum amount of space and can be conveniently installed and removed for replacement or repair.

It is another object of the present invention to provide a new and improved filter unit wherein a substantial quantity of a contaminated medium can be efficiently, quickly, and easily cleansed.

A still further object of the present invention resides in the provision of a supporting structure which coacts with filter sheets to define conducting passageways for the contaminated medium and to prevent sagging of the sheets due to the weight of the solid contaminants collected thereon.

It is yet another object of the present invention to provide a new and improved filter unit comprising a double filter structure adapted to be wound upon itself to provide a filter unit of desired configuration.

The invention, both as to its organization and method of operation, together with further objects and advantages thereof will best be understood by reference to the following detailed description and claims taken in conjunction with the accompanying drawings wherein:

FIG. 1 is a perspective view illustrating the use of a filter device embodying the principles of the present invention in a duct or the like system;

FIG. 2 is an enlarged sectional view taken along line 2—2 of FIG. 1;

FIG. 3 is an enlarged fragmentary sectional view taken along line 3—3 of FIG. 2;

FIG. 4 is an enlarged fragmentary sectional view taken along line 4—4 of FIG. 3;

FIG. 5 is a fragmentary perspective view illustrating a double filter structure embodied in the filter device of FIG. 1 in its preassembled position;

FIG. 6 is a fragmentary, sectional view showing another embodiment of the filter of the present invention;

FIG. 7 is a broken, sectional view taken along a line corresponding substantially to line 7—7 in FIG. 6; and FIG. 8 is a reduced, fragmentary, perspective view of the filter shown in FIGS. 6 and 7.

The foregoing and other objects are realized in accordance with the present invention by providing a generally cylindrical filter unit comprising a plurality of filter layers wound one upon the other. In one form of the invention, the filter structure includes corrugated spacers disposed between filter sheets thereby to provide a plurality of channels extending longitudinally of the filter unit. The channels formed in alternative layers of this unit may be termed inlet channels since they receive the contaminated fluid to be cleansed while the channels in the layers intermediate these alternate layers may be called outlet channels since they deliver the cleansed or filtered fluid after it has passed through the filter sheets. In order to provide for flow of the contaminated medium through the filter sheets, the ends of the outlet channels are closed at one end of the filter unit, while the ends of the inlet channels are closed at the other end of the unit. Accordingly, the contaminated fluid, i.e., dust laded air, flows into the open ended inlet channels and through the filter sheets where the soild contaminants are removed, so that the cleansed air passes into the outlet channels. A cover is provided on the outside of the filter unit to maintain the layers of the filter structure in assembled condition. The filter sheets are preferably dry although they could be coated with a viscous adhesive for holding the dirt and particles in those areas where the contaminated medium passes through the sheets. These filter sheets may be of any suitable medium such as porous cloth, felt, paper, fabric, or synthetic material such as nylon, Orlon or the like, but it should be understood that any flexible porous or gas pervious material could be used wherever required for a particular filtering purpose. The term "filter sheet" as used hereinafter, is therefore, intended to embrace all such flexible porous filters.

Referring now to the drawings and more particularly to FIG. 1 thereof, the filter unit of the present invention is there illustrated in broken lines and is identified by the reference numeral 10. This unit 10 is disposed within a cylindrical duct 12, only a portion of which is illustrated in the drawings. A contaminated fluid medium such as dust laded air, gas, vapors, or the like (hereinafter called dust laded air), passes from the inlet end of the duct 12 to the outlet end as it proceeds from left to right in the direction indicated by the solid arrow-headed line 14. This air flows through the filter unit 10 to remove the solid contaminants, such as dust particles and other impurities (hereinafter called dust), in order to provide cleansed air at the point indicated by the solid arrow-headed line 16.

The filter unit 10 is preferably cylindrical in shape and is dimensioned to fit snugly within the duct 12. The filter extends across or covers substantially the entire cross sectional area of the duct 12. The filter unit 10 is readily removable from the duct 12 for repair or replacement and, to this end, is easily inserted into and withdrawn from the duct 12 through an access door (not shown). In order to prevent the dust laded air from bypassing the filter unit 10 by flowing along its outer surface, suitable stops or guides (not shown) may be provided within the duct 12 for seating against the edge of the filter unit. These guides or stops may include resilient cushions made of foam rubber or the like providing an air-tight seal between the peripheral edge of the filter unit and the duct.

Considering now the detailed construction of an embodiment of the invention shown in FIGS. 2 to 5, inclusive, the filter unit there shown has a flat circular inlet face or end 20 and a flat circular outlet face or end 22 interconnected by a generally curved side 24. This unit is formed by spirally winding a pair of filter structures or layers 30 and 32 to provide the illustrated cylindrical shape and then applying a protective cover 33 over the outside for the purpose of maintaining the filter layers in assembled relation.

The filter layer 30 comprises a flexible, porous filter sheet or lamina 34 disposed adjacent to and in engagement at spaced points with a flexible corrugated spacer 38, while the filter structure 32 comprises a similar filter sheet or lamina 36 and a flexible corrugated spacer 40. To form the filter unit the filter sheets and the corrugated spacers are laid flat in the manner shown in FIG. 5 with the spacer 38 located between the bottom of the sheet 34 and the top of the sheet 36 and with the spacer 40 disposed beneath the sheet 36. The right end of the layer 30 as viewed in FIG. 5 is closed by an elongated adhesive sealing tape 46 which adheres to the upper marginal edge of the sheet 34 and to the lower marginal edge of the spacer 38. In similar manner, the left end of the layer 32 is closed by an adhesive tape 48 adhering to the upper edge of the sheet 36 and to the lower edge of the spacer 40. The layers are then rolled or wound to form a spiral of the type shown in FIGS. 2 and 4. Since the end tapes have adhesive on both their upper and lower surfaces, the under surface of the corrugated spacer 38 is adhesively secured to the upper surface of the tape 48 and the under surface of the corrugated spacer 40 is adhesively secured to the upper surface of the tape 46 when the two layers are rolled together. Hence, during the winding or rolling up operation, the filter structures are adhesively secured together along both of the longitudinal ends and since the end tapes 46 and 48 are flexible and resilient, good airtight seals are provided at the ends of the layers 30 and 32.

When the layers are rolled together, the filter sheets 34 and 36 and the corrugated spacers 38 and 40 coact with one another to provide a plurality of inlet and outlet channels extending the entire length of the filter unit 10 between its faces 20 and 22. More particularly, as is best shown in FIGS. 4 and 5, the corrugated spacer 38 coacts with the filter sheet 34 of the filter layer 30 and the filter sheet 36 of the filter layer 32 to provide a plurality of inlet channels 42. Similarly, the corrugated spacer 40 coacts with the filter sheet 36 of the filter layer 32 and the filter sheet 34 of the filter layer 30 to provide a plurality of outlet channels 44. Hence, the generally elongated spacers 38 and 40 maintain the filter sheets 34 and 36 in fixed spaced relation in the spiral wound filter unit and furthermore divide the spaces between the filter sheets 34 and 36 into a number of inlet and outlet channels 42 and 44. As is shown best in FIG. 3, the widths of the filter sheets 34 and 36 and corrugated spacers 38 and 40 are the same so that the faces 20 and 22 of the filter unit 10 are generally flat.

As clearly illustrated in FIG. 3, the inlet channels 42 are open at the face 20 and are closed at the face 22 by the adhesive end tape 46, while the channels 44 are open at the face 22 and are closed at the face 20 by the adhesive tape 48. Thus, the dust laded air on the upstream side of the filter 10 enters only the inlet channels 42 and is, of course, prevented from entering the outlet channels 44 by the presence of the end tape 48 covering the inlet ends of all of the latter channels. Similarly, the tape 46 prevents the dust laded air which passes into the inlet channels 42 from passing directly out of the filter unit 10 through the outlet ends of the inlet channels. The dust laded air in the inlet channels 42 flows upwardly and downwardly, as seen in FIG. 4, through one or the other of the filter papers 34 and 36 and into adjacent outlet channels 44. The dust particles in the dust laded air are thus collected on the upstream side of the filter sheets 34 and 36 and, as a result, only cleansed air which is relatively free from the dust particles and/or other impurities passes into the outlet channels 44 and out of the filter unit 10.

In a filter unit built in accordance with the present invention, spacers 38 and 40 are approximately one inch in height to maintain the filter sheets 34 and 36 approximately one inch apart. Inasmuch as the dust laded air entering the duct 12 may contain a considerable amount of moisture, the corrugated spacers 38 and 40 may comprise paper which is treated with a suitable water proofing material in order to prevent softening and breaking down of the corrugations. Similarly, a water proof plastic adhesive is preferably used to secure the end tapes 46 and 48 to the adjacent filter sheets 34 and 36 and corrugated spacers 38 and 40. Since the filter sheets 34 and 36 are able to withstand a considerable amount of moisture, it is not necessary that they be treated with any water proofing material.

It will be appreciated that different types of filter sheets 34 and 36 may be used in the filter device 10 in accordance with the demands of the particular filter problem. However, irrespective of the thickness or type of filter sheets used, the sheets are supported along their entire length or width at spaced intervals by the spacers 38 and 40 with the result that there is little or no tendency for the sheets 34 and 36 to sag due to the weight of the solid contaminants accumulating thereon. This type of support permits the use of relatively inexpensive filter materials of low mechanical strength. Since paper is considerably less expensive than cloth or felt, its use is generally preferred. Thus, the filter arrangement described above is characterized by a rigid compact construction which is relatively easy and inexpensive to manufacture.

In many installations, particularly those where a very large filtering area is required in a very small space, the form of the invention illustrated in FIGS. 6 to 8, inclusive, is preferred because it provides a much larger filter area for a given volume of the filter unit than is the case of the structure shown in FIGS. 2 to 5. The unit shown in FIGS. 6 to 8 is indicated by reference numeral 110 and it is adapted to be disposed within a cylindrical duct in exactly the same manner as the filter unit 10 previously described. The unit 110 is, therefore, cylindrical in shape and includes a plurality of corrugated layers 138a, 138b, 138c, etc. In this case, however, the corrugated layers actually perform the filtering and, to this end, they are formed of suitable filtering material such as filter paper. These layers are disposed or wound one upon the other and are concentric with the axis of the unit. They are held in position by bonding in any suitable manner to reinforcing strips 130 which are disposed between adjacent layers and are also concentric with the axis of the device. The strips 130 are flexible but a sufficient number is employed to provide adequate strength for holding the unit together and for preventing collapse of the corrugations. As is shown in FIG. 8 the reinforcing strips are spaced inwardly of the faces of the filter device so that the filter edges are not covered. The entire structure is preferably enclosed with an outer cover or layer 133.

The corrugations extend through the unit from the inlet face 120 to the outlet face 122 and the corrugations in the different layers are so formed that they cooperate with the corrugations in adjacent layers to define groups of channels extending longitudinally through the unit. The channels which are covered or shaded in FIG. 6 serve as the inlet channels and they are identified by reference numeral 142 while the channels which are open or unshaded as viewed in FIG. 6 serve as outlet channels and are identified by reference numeral 144. The outlet ends of the inlet channels 142, that is, the ends adjacent the face 122 are closed. This may be done in any suitable manner as, for example, by use of sealing wax which covers the ends of the channels as indicated at 146. The sealing wax may be applied by dipping the outlet end of the filter device in a pool of molten wax so that the wax adheres to the ends of the corrugated layers and forms an air-tight seal for the ends of the channels 142. Of course, the wax must be prevented from closing the ends of the outlet channels 144 and, to this end, removable strips (not shown) may be inserted between adjacent ends of certain pairs of the layers while the dipping is being effected. After the filter is removed from the wax pool, these strips may be withdrawn to pull out the molten wax adhering thereto in order to prevent the outlet channels from becoming sealed. Thus, when dipping the outlet end of the filter, one such removable strip is inserted between the ends of the pair of layers 138a and 138b, another strip is inserted between the ends of the pair of layers 138c and 138d and so on. A strip is not inserted between the pair of layers 138b and 138c, one is not inserted between the pair of layers 138d and 138e and so on, since the areas between these particular pairs of layers are to be filled with wax in order to form the seals for the inlet channels. In this manner, when the outlet face or end of the filter is dipped in the molten wax, the outlet ends of the inlet channels 142 are sealed while the ends of the outlet channels 144 are prevented from being sealed by the removable strips.

In similar manner, the inlet face or end 120 of the filter device may be dipped in wax to seal the inlet ends of the outlet channels 144 while, at the same time, leaving the inlet ends of the channels 142 open. This is, of course, achieved by inserting a removable strip between the ends of the pair of layers 138b and 138c, by inserting another such strip between the ends of the layers 138d and 138e and so on. As described above, these strips are withdrawn following the dipping operation to prevent the wax from sealing the inlet ends of the channels 142. The wax, of course, adheres to the ends of the layers to cover the inlet ends of the outlet channels 144 as is indicated by the reference numeral 148 in FIG. 7. It will be observed that during the dipping process a removable strip is inserted between one pair of layers at one of the faces 120 or 122 of the unit while at the other face no such strip is employed. Thus, the strips may be said to be inserted between alternate pairs of layers at the two faces of the unit.

In the construction shown in FIGS. 6 to 8, the contaminated fluid enters the channels 142 at the face 120 or inlet end of the unit. It cannot escape from these channels at the face 122 due to the presence of the hardened sealing wax 146 covering the inlet channel ends and, hence, it is directed through the corrugated layers and into the outlet channels 144 surrounding each inlet channel. Since the corrugated layers are formed of filter material, they remove or filter solid contaminants from the fluid so that clean fluid flows into the outlet channels 144 and out of the filter device. The entire area of the corrugated layers is available for filtering, an arrangement which is, in many cases, preferable to that shown in FIGS. 2 to 5 where only the flat portion of the filter sheets 34 and 36 dividing the channels is available for cleaning. In the form of the invention shown in FIGS. 6 to 8, the reinforcing strips 130 are formed of a material which is water proof or which is treated with a moisture proof substance so that the unit 110 will not deteriorate or collapse when exposed to moisture.

If the filter unit is used to filter large volumes of contaminated fluid, it will be necessary to remove the accumulated dust and impurities from the upstream side of the filter sheets at frequent intervals. This may be done by removing the unit from the duct 12 and vibrating it either manually or by machine to shake out the accumulated particles. To clean the filter unit, in situ, that is, without removing it from the duct, the direction of flow of fluid in the duct system may be reversed and its rate of flow may be greatly increased, that is, a high speed stream of air may be directed by means of a blower or the like through the duct 12 into the outlet channels in order to force the dust particles from the surfaces of the filter sheets and into the fluid stream passing out of the filter through the inlet channels. The contaminated air stream in the duct 12 may then be passed through a dust separator such as a cyclone or the like.

Instead of employing a blower to force air through the duct 12, a suction device may be connected to the inlet side of the duct 12 to suck the air in the reverse direction through the filter unit, thereby to draw off the dust particles accumulated on the filter sheets. The air sucked from the filter unit may then be collected at a remote point in order to permit removal of the contaminating particles from the air stream.

Of course, because of the inexpensive character of the filter device, it is economical to simply replace the filter device whenever improper or inefficient filter action is observed.

While a particular embodiment of the invention has been shown and described, it will be recognized that many modifications will readily occur to those skilled in this art and it is, therefore, contemplated by the appended claims to cover all such modifications that fall within the true spirit and scope of the invention.

What is claimed as new and desired to be obtained by Letters Patent of the United States is:

1. A generally cylindrical filter device for removing solid contaminants from a contaminated fluid medium, said device being formed of a first filter layer including a first filter sheet and a first corrugated spacer of substantially the same width as the filter sheet, and a second filter layer including a second filter sheet and a second corrugated spacer of substantially the same width as said second filter sheet, the corrugations of said spacers extending parallel to the axis of the device, said layers being disposed one about the other and cooperating to form a round cylindrical structure having a first flat face and a second flat face with the corrugations extending entirely between said faces to define first and second contiguous groups of channels extending longitudinally of the filter device, adhesive sealing tape at one end of said first filter layer adhering to the marginal ends of said first filter sheet and said first corrugated spacer of the said first filter layer with one edge of said tape adhesively secured to one surface of said first filter sheet and to one surface of said second corrugated spacer and the other edge of said tape being adhesively secured to one surface of said first corrugated spacer and to one surface of said second filter sheet, adhesive sealing tape at the other end of the second filter layer adhering to the marginal ends of said second filter sheet and said second corrugated spacer of said second filter layer with one edge of the last-mentioned tape adhesively secured to one surface of said second filter sheet and one surface of said first corrugated spacer and the other edge of said last-mentioned tape adhesively secured to one surface of said second corrugated spacer and one surface of said first filter sheet, medium entering the device through the open end of the channels provided in one of said filter layers passing through the filter sheets in said layers into the channels provided in the other one of the filter layers thereby to leave the filter device through the open ends of the channels provided in said other one of the filter layers.

2. A method of forming a generally cylindrical filter device for removing solid contaminants from a contaminated fluid medium, said method comprising the steps of assembling a first filter sheet and a first corrugated spacer of substantially the same width, said sheet being positioned over said first spacer, adhering an adhesive tape over the marginal edges of said first spacer and said first sheet along one edge thereof, folding both edges of said adhesive sheet over the outer edges of said spacer and said sheet respectively, assembling a second filter sheet and a second corrugated spacer of substantially the same width, said second sheet being positioned over said second spacer, adhering an adhesive tape over the other marginal end of said second corrugated sheet and said second filter sheet at the end thereof remote from said first adhesive tape, folding the edges of said tape over the respective outer surfaces of said second spacer and said second sheet, assembling said second filter layer over said first filter layer, rolling said layers to form a spiral, and adhesively securing the folded edges of said first and second adhesive tapes respectively to said second and first filter layers, respectively.

References Cited in the file of this patent

UNITED STATES PATENTS

| | | |
|---|---|---|
| 2,190,683 | Schaaf et al. | Feb. 20, 1940 |
| 2,190,886 | Schaaf et al. | Feb. 20, 1940 |
| 2,222,548 | Sigmund | June 22, 1943 |
| 2,355,373 | Hankison | Aug. 8, 1944 |
| 2,397,759 | Sigmund | Apr. 2, 1946 |
| 2,403,261 | Clark | July 2, 1946 |
| 2,669,995 | Troy | Feb. 23, 1954 |

FOREIGN PATENTS

| | | |
|---|---|---|
| 540,215 | Great Britain | Oct. 9, 1941 |
| 703,823 | Great Britain | Feb. 10, 1954 |